UNITED STATES PATENT OFFICE.

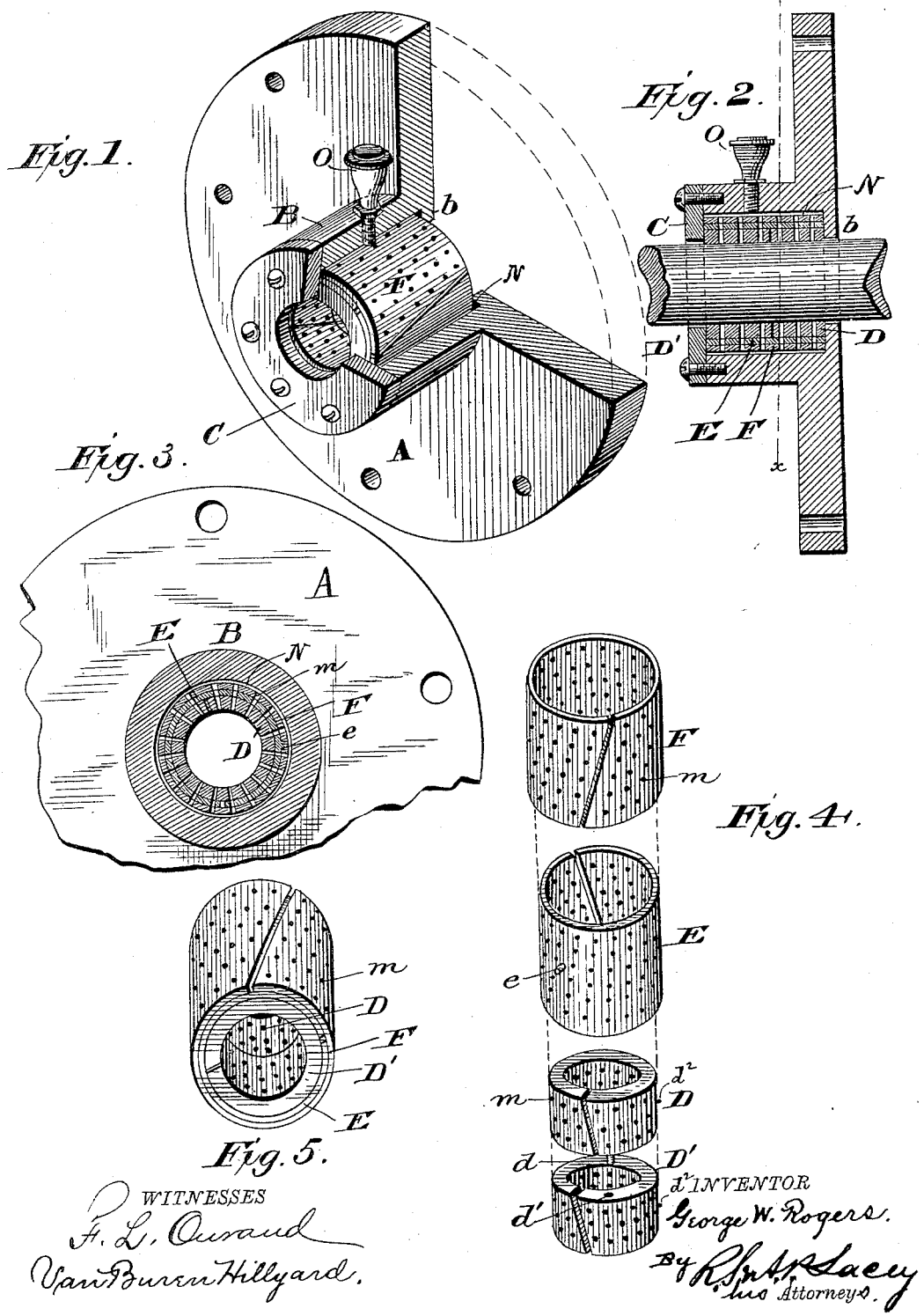

GEORGE W. ROGERS, OF KENDALLVILLE, INDIANA.

PISTON-ROD PACKING.

SPECIFICATION forming part of Letters Patent No. 454,384, dated June 16, 1891.

Application filed September 26, 1890. Serial No. 366,222. (No model.)

*To all whom it may concern:*

Be it known that I, GEORGE W. ROGERS, a citizen of the United States, residing at Kendallville, in the county of Noble and State of Indiana, have invented certain new and useful Improvements in Piston-Rod Packings; and I do hereby declare the following to be a full, clear, and exact description of the invention, such as will enable others skilled in the art to which it appertains to make and use the same.

This invention relates to metallic packing especially adapted for piston-rods, and has for its object to provide a packing that will automatically compensate for wear and preserve a steam-tight joint without creating unnecessary friction on the rod or moving part, and which will permit a free access of the lubricant to all parts of the rod to be lubricated.

The improvement consists of a series of self-expansible concentric metallic rings arranged to break joints, and having a series of coincident openings through them, the rings being held in a fixed relative position to preserve the coincidence of the oil-openings, and having the said openings arranged in circles around the rings, and having the openings of one circle slightly out of line with the openings of the adjacent circles of openings.

The improvement also consists of the novel feature and the peculiar construction and combination of the parts which will be hereinafter more fully described and claimed, and which are shown in the annexed drawings, in which—

Figure 1 is a perspective view, parts being broken away, of a cylinder-head, showing the application of the invention. Fig. 2 is a longitudinal section through the stuffing-box, the head being broken away, showing the position of the piston-rod by full lines. Fig. 3 is a cross-section on the line X X of Fig. 2. Figs. 4 are detailed views of the packing-rings detached and separated. Fig. 5 is a perspective view of the packing constructed in accordance with and embodying my invention.

In the drawings, A represents the head of a steam-engine cylinder, which is provided with the stuffing-box B, that is slightly larger than the piston-rod opening $a$ in the said head A to form the shoulder $b$ at the inner end of the stuffing-box for the packing to bear against, the cap-ring C at the outer end of the stuffing-box holding the packing in place in the said stuffing-box. The stuffing-box may project from either or both sides of the cylinder-head.

The packing is composed of a series of metallic rings, which are split, and which are expansible to automatically take up wear. These rings are concentrically arranged within one another to break joints, and are held by suitable means to prevent any rotary movement of the one on the other, and have a series of coincident openings to permit the passage of the lubricant through the packing to the part to be lubricated. An annular oil-space or chamber surrounds the packing, the lubricant being supplied thereto in any convenient manner.

As shown, the packing is composed of the series of metallic rings D, D', E, and F, which are similarly constructed, being split rings of brass, copper, or similar material of graduated sizes, so the one will snugly fit within the other to form the packing shown most clearly in Fig. 5. The rings E and F are of equal width, and the ring E is provided with a dowel-pin $e$ to enter the space between the separated ends of the ring F and prevent a turning of the rings E and F relatively to each other when concentrically arranged. The rings D and D' are one-half the width of the rings E and F, and are of equal diameter, and are placed end to end, being held in a fixed relation by the dowel-pin $d$, projecting from the end of one ring entering the opening $d'$ in the end of the other ring. The dowel-pins $d^2$, projected from the rings D and D', enter the space between the separated ends of the ring E and hold them in a fixed relative position thereto. Each of the rings is perforated, the perforations being so formed that when the rings are assembled, as shown in Fig. 5, they will coincide. The openings $m$ in the rings are arranged in circles, the openings of one circle being arranged out of line with the openings of the other circles, whereby the lubricant will touch every part of the circumference of the rod in its travel through the box B.

The bore of the packing is slightly smaller than the piston-rod to which it is to be applied, and must be sprung on the same. The rings being of springy material will hug the rod closely and take up wear and preserve a steam-tight joint. The annular oil-space between the packing and the inner walls of the box B is supplied with lubricant from the oil-cup O. A steam-tight joint is had between the ends of the packing and the ends of the box, and the same means, shoulder B, and ring C, which hold the packing in place and form the steam-tight joints at the ends of the said packing, also form closures for the ends of the annular oil-space N.

It is well known that the piston-rod in the operation of the engine receives a slight lateral or vibratory motion. This vibratory motion is not interfered with by my construction, in that the packing is free to allow the vibrations thereof because of the surrounding oil-chamber N.

Having thus described my invention, what I claim, and desire to secure by Letters Patent, is—

1. A self-expansible metallic packing composed of a series of split spring metal rings concentrically arranged within one another to break joints, each ring being provided about its periphery with a series of openings, which openings coincide when the rings are assembled, and the rings being held in a fixed relation when assembled to preserve the coincidence of the said openings, substantially as and for the purpose described.

2. A self-expansible metallic packing composed of a series of split spring-rings concentrically arranged within one another to break joints and held in a fixed relation by dowel-pins which project from one ring and enter the space between the separated ends of the other ring, and having a series of coincident openings in the said rings, substantially as described, for the purpose specified.

3. A self-expansible metallic packing composed of a series of split spring-rings arranged within one another and having a series of coincident openings, the inner ring being made up of two parts which are held in a fixed relation by a dowel-pin, and each part of said ring having dowel-pins to enter the space between the separated ends of the surrounding ring, substantially as described, for the purpose set forth.

4. The combination, with the stuffing-box and the piston-rod, of a metallic packing placed within the said box and sprung on the piston-rod and having an annular oil-chamber between it and the sides of the box, the packing being composed of a series of split spring-rings of spring metal, which are concentrically arranged within one another, and which are coincidently perforated to permit the passage of the lubricant, and which are held in a fixed relative position to preserve the coincidence of the said openings, substantially as and for the purpose specified.

In testimony whereof I affix my signature in presence of two witnesses.

GEORGE W. ROGERS.

Witnesses:
VAN BUREN HILLYARD,
LILLIE M. HILLYARD.